(12) United States Patent
Kelts (10) Patent No.: US 12,131,398 B2
(45) Date of Patent: Oct. 29, 2024

(54) COMPUTING DEVICES AND METHODS FOR EXCHANGING IDENTITY DATA

(71) Applicant: Idemia Identity & Security USA LLC, Reston, VA (US)

(72) Inventor: A. David Kelts, Arlington, MA (US)

(73) Assignee: IDEMIA IDENTITY & SECURITY USA LLC, Reston, VA (US)

( * ) Notice: Subject to any disclaimer, the term of this patent is extended or adjusted under 35 U.S.C. 154(b) by 546 days.

(21) Appl. No.: 17/350,828

(22) Filed: Jun. 17, 2021

(65) Prior Publication Data

US 2021/0342965 A1 Nov. 4, 2021

Related U.S. Application Data

(63) Continuation of application No. 15/642,198, filed on Jul. 5, 2017, now Pat. No. 11,354,763.

(60) Provisional application No. 62/358,537, filed on Jul. 5, 2016.

(51) Int. Cl.
*G06Q 50/26* (2024.01)
*G06F 21/34* (2013.01)
*G06Q 30/018* (2023.01)

(52) U.S. Cl.
CPC ........... *G06Q 50/265* (2013.01); *G06F 21/34* (2013.01); *G06Q 30/018* (2013.01)

(58) Field of Classification Search
None
See application file for complete search history.

(56) References Cited

U.S. PATENT DOCUMENTS

| | | | |
|---|---|---|---|
| 6,213,391 | B1 | 4/2001 | Lewis |
| 6,219,439 | B1 | 4/2001 | Burger |
| 8,754,751 | B1 | 6/2014 | Picolli |
| 2008/0048022 | A1 | 2/2008 | Vawter |
| 2009/0164798 | A1 | 6/2009 | Gupta |
| 2010/0262649 | A1 | 10/2010 | Fusz |

(Continued)

FOREIGN PATENT DOCUMENTS

EP 2493231 A2 8/2012

OTHER PUBLICATIONS

International Search Report and Written Opinion in International Application No. PCT/US2017/040766, dated Sep. 11, 2017, 12 pages (with English translation).

(Continued)

*Primary Examiner* — Jan P Mincarelli
(74) *Attorney, Agent, or Firm* — Armstrong Teasdale LLP (57) ABSTRACT

A computer-implemented method that includes providing, by a first computing device, a request for identifying data, wherein the first computing device is accessible by a first user. The method may further include receiving, by a second computing device, the request provided by the first computing device, wherein the second computing device is accessible by a second user. Additionally, the method may include, transmitting, by the second user, identifying data to a location accessible by the first computing device, wherein the identifying data is transmitted to the location based on an address provided by the first user. The method may yet further include accessing, by the first user, the identifying data transmitted by the second user; and validating, by the first user, the identifying data provided by the second user in response to accessing the identifying data.

26 Claims, 4 Drawing Sheets

(56) References Cited

U.S. PATENT DOCUMENTS

| | | |
|---|---|---|
| 2012/0090038 A1 | 4/2012 | Pacella et al. |
| 2014/0013106 A1 | 1/2014 | Redpath |
| 2014/0043141 A1* | 2/2014 | Cazanas .................. G07C 9/27 340/5.81 |
| 2015/0081538 A1* | 3/2015 | Renard .................. G06Q 20/36 705/41 |
| 2016/0087957 A1* | 3/2016 | Shah ..................... H04L 63/205 726/1 |

OTHER PUBLICATIONS

EP Extended European Search report in European Application No. 17824834.0, dated Mar. 6, 2019, 10 pages.

* cited by examiner

COMPUTING DEVICES AND METHODS FOR EXCHANGING IDENTITY DATA

CROSS-REFERENCE TO RELATED APPLICATIONS

This application is a Continuation of U.S. patent application Ser. No. 15/642,198 filed Jul. 5, 2017, titled "Communication Flow for Verification and Identification Check," which claims priority to U.S. Provisional Patent Application No. 62/358,537 filed Jul. 5, 2016, the contents of which are hereby incorporated herein by reference in their entirety.

FIELD

The present disclosure is related generally to secure and privacy preserving communication flow for verification and identification checks.

BACKGROUND

Physical identification cards such as driver licenses are commonly used for verifying the identity of an individual, providing access to restricted areas, authorizing an individual to purchase age-restricted content, or providing validation of an individual's authorization to legally operate a motor vehicle in one or more jurisdictions.

BRIEF DESCRIPTION

Use of Mobile Driver's Licenses (mDL) is being considered in a variety of domestic and international jurisdictions. However, solutions regarding information flow and communication paths are needed to address how mDLs can be effectively verified during routine traffic and roadside stops initiated by law enforcement officers. In particular, solutions are desired that provide convenience for the mDL holder that exceeds the perceived benefits of carrying physical driver identification cards.

Additionally, solutions should increase or improve upon the safety and security of law enforcement officers. Communication and information flow solutions should also be compatible with the framework of existing communications equipment disposed in law enforcement vehicles and personal equipment used by officers. Furthermore, privacy considerations of all parties must be carefully balanced against the need to provide any required information specific to the driver or vehicle occupants.

In general, one innovative aspect of the subject matter described in this specification can be embodied in a computer-implemented method. The method includes providing or broadcasting, by a first computing device, a request for identifying data along with optional self-identification data for evaluation by the receiver, wherein the first computing device is accessible by a first user. The method may further include receiving, by a second computing device, the request and self-identification provided by the first computing device, wherein the second computing device is accessible by a second user.

Additionally, the method may include, transmitting, by the second user, identifying data, which may be an identifying token, to a location accessible by the first computing device, wherein the identifying data is transmitted to the location based on an address provided by the first user. The method may yet further include accessing, by the first user, the identifying data transmitted by the second user; and validating, by the first user, the identifying data provided by the second user in response to accessing the identifying data. The first user may also use the token to request additional identifying data.

These and other implementations can each optionally include one or more of the following features. For example, the method may still further include, verifying, by the second user, the existence of a self-identifying feature of the first user, the identifying feature of the first user being, for example, a law enforcement association indicator or some publicly verifiable certificate of authenticity. In some implementations, the request for identifying data provided or broadcast by the first computing device is provided by way of a proximity-based communication channel.

In one aspect of the subject matter described in this specification, the proximity-based communication channel is configured to exchange data communications between the first and second computing devices by way of, in some implementations, a non-paired Bluetooth communication protocol. In another aspect, the identifying data transmitted by the second user could include at least one of a driver identification number and an indication of the jurisdiction in which the second user is licensed to operate a motor vehicle or a privacy-enhancing token identifying the second user.

In other implementations, the address provided by the first user is a uniform resource locator (URL) for an identity endpoint that is accessible by both users. The request for identifying data received by the second computing device may include a user selection option comprising one of an accept option and a deny option, and where selection of the accept option by the second user enables the second user to transmit validated identifying data to the identity endpoint of the first user or the privacy-enhancing token.

In implementations where a token is the response to the first-user, the token can be used by the first user to request user authentication, consent, and identifying data directly from the second user, or from an Identity Provider (IDP) and User Authentication Services to which the second user is pre-registered. The IDP in some implementations could be an Open ID Connect Provider (OP). The challenge protocol to an OP from the first-user could, in these implementations, be Open ID Connect with the OP orchestrating user authentication and consent using standard or proprietary protocols. The challenge protocol to the device of the second user by the OP could be Fido Alliance or similar.

The mDL device of the second-user has the ability to authenticate the user of the device application. Whether challenged by the OP or by the device of the first-user, the mDL is responsible for demonstrating via cryptographic or other means that the second-user is the intended user of the application. The response to this challenge sent back to the first-user, augmenting the identifying information with user authentication information. In some implementations, the response to the challenge is relayed directly to the device endpoint of the first-user. In other implementations, the response to the challenge is relayed by the OP from the device of the second-user to the identity endpoint of the first user.

In another aspect of the subject matter described herein, the first computing device includes a display and is at least partially disposed within a law enforcement vehicle, and the identifying data accessed by the first user is viewable within the law enforcement vehicle by way of the display. In some implementations, the first computing device is a mobile computing device, such as a smartphone device or tablet device, that can be easily carried by an individual or mounted on an item used for travel (e.g., motorcycle, bicycle, etc.). In various implementations, the first user may be a law enforcement officer and the second user may be at least one of an operator of a motor vehicle or a passenger within a motor vehicle.

In general, another innovative aspect of the subject matter described in this specification can be embodied in a non-transitory computer storage device encoded with a computer program. The program may comprise instructions that when executed by one or more processing units cause the one or more processing units to perform operations including, providing, by a first computing device, a request for identifying data, wherein the first computing device is accessible by a first user. The operations performed by the one or more processing units may further include, receiving, by a second computing device, the request provided by the first computing device, wherein the second computing device is accessible by a second user.

The operations performed also include, responding by transmitting, by the second user, identifying data to a location accessible by the first computing device, wherein the identifying data is transmitted to the location based on an address provided by the first user. Additionally, the operations also include, accessing, by the first user, the identifying data transmitted by the second user; and validating, by the first user, the identifying data provided by the second user in response to accessing the identifying data.

The operation of responding to the request by the first user may be forwarded by the second user to an Identity Provider who orchestrates authentication and consent of the proper User of the second-device, and responding on behalf of the second-user with identifying information. An optional operation pathway is for the second device to transmit or respond with a one-time identity token that the first device may exchange with the Identity Provider for authenticated identifying information about the second-user and confirmation that the second-user themselves was authenticated as the proper holder or user of the identity in the second-device.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments to realize one or more of the following advantages. The described teachings enable user privacy during electronic identity verification checks and through electronic based permission and consent indicated by a user that is asked to provide identity credentials. Users, entities, or individuals that request identifying data from other users/persons can ensure their own safety by engaging in proximity and electronic based identity information exchange. An identity of a second user can be confirmed by a first user (e.g., a police officer) via electronic identity data exchange. Hence, the first user does not have to be in close physical proximity of the second user to verify the identity of the second user or to verify or validate other data associated with the second user.

The described systems and methods provide the ability for a first user to initiate a data transmission(s) for obtaining identity data on unsecured channels, then opt to move or transition the data transmissions to a secure "online" or internet based connection to retrieve data. Such unsecure to secure transitions can provide computing efficiencies based on selective or as-needed utilization of encryption functions as well as other secure data transmissions options. For example, users can opt to execute identity verification processes via a secure "local" (e.g., Bluetooth or other proximity based channels) channel as well to complete data transaction for ID authentication, verification, and validation.

The described systems can be implemented to forego the use of passwords or card access numbers that may need to be exchanged out of band such as with e-passports or smart card readers. Hence, additional computing efficiencies can be realized when memory resources are no longer required for password and access number storage requirements. Further, implementation of the described teachings can result in computing efficiencies because device processors will not have to perform password and access number analysis for matching and verification steps in response to user input of pass codes or access numbers.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification provides one or more systems and methods for secure privacy-preserving communication patterns that enhance information exchange between law enforcement and motor vehicle operators having a verified driver's license (DL) number. In various implementations, the motor vehicle operator may use a mobile DL (mDL) during routine roadside stop initiated by law enforcement officers. The communication or data flow paths described herein supports the privacy of the vehicle operator and/or passengers and enhances safety and security for law enforcement personnel.

Moreover, this present disclosure provides a system and method for secure and private transmission of verified identity information using an mDL App to law enforcement officers using their systems during routine traffic stops. A communication flow path is described for transmission of verified information such that law enforcement safety is increased while vehicle operator privacy is enhanced.

Figure 1:
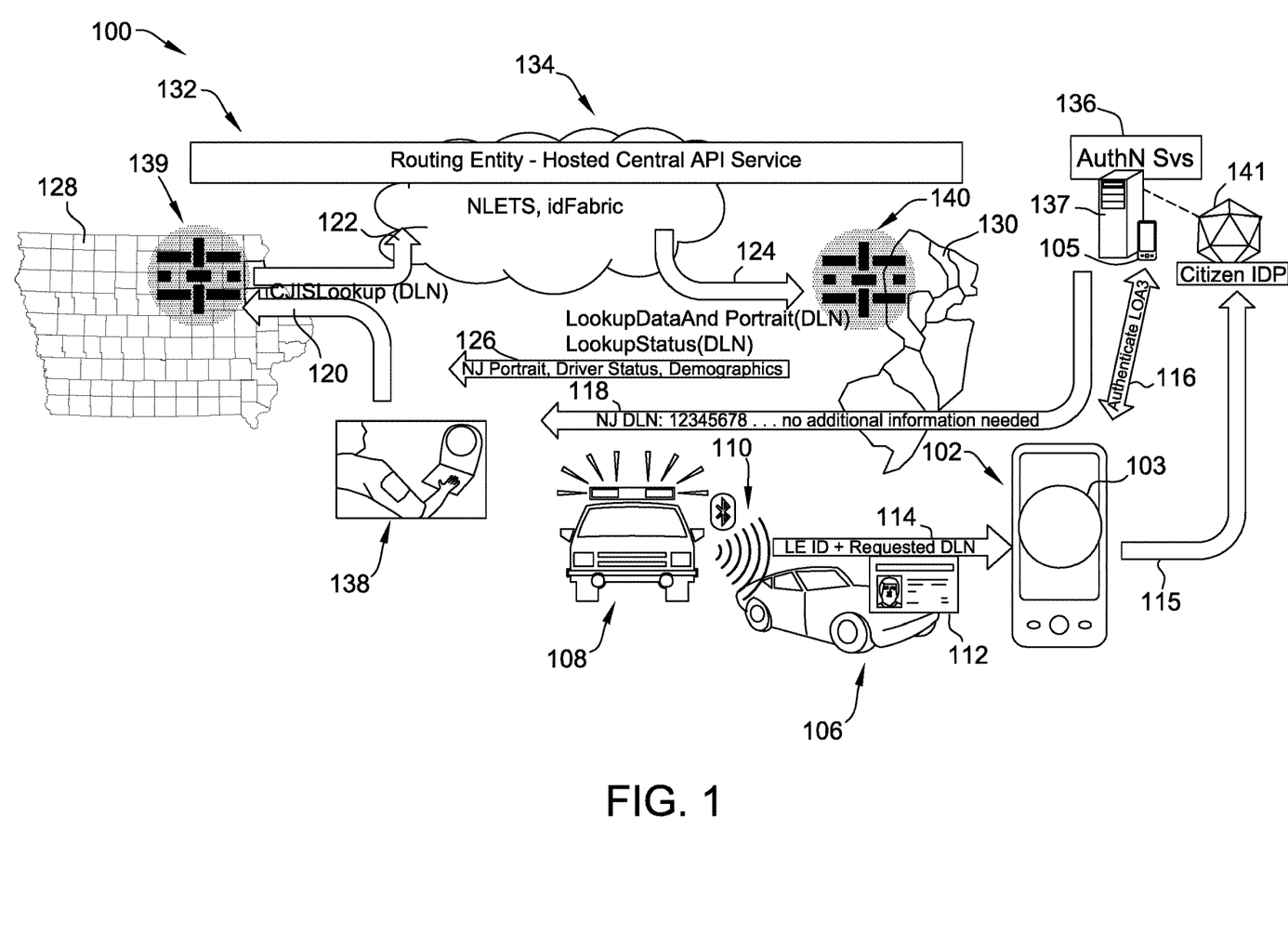
FIG. 1 illustrates a block diagram of an example communication system for secure routing of information with user authentication and consent used in verification and identification checks.

FIG. 1 illustrates a block diagram of an example communication system 100 (hereinafter "system 100") for secure routing of information used in verification and identification checks. System 100 generally includes second computing device 102 with mDL, first or receiving computing device 104, and possibly vehicle 106 and vehicle 108. Computing device 102/104 may be a cellular smartphone device (e.g., an iPhone, Samsung Galaxy, or an Android device), a laptop computer, a tablet device, or any other electronic device capable of receiving and transmitting data communications.

In some implementations, vehicle 106 is conventional motor vehicle such as a car, van, motorcycle, bus, truck or commercial vehicle having a vehicle operator and one or more passengers or occupants. Moreover, in some implementations, vehicle 108 is a law enforcement vehicle such as a police cruiser having one or more law enforcement officers as vehicle occupants.

In various implementations, computing device 102 and 104 each include at least one processing unit and at least one storage medium. The processing unit may be configured to process a computer program having instructions for execution within computing device 102/104. The processing unit may include one or more processors. The storage medium stores information within computing device 102/104. In some implementations, the storage medium is a volatile memory unit or units. In some other implementations, the storage medium is a non-volatile memory unit or units.

The storage medium may also be another form of computer-readable medium, such as a floppy disk device, a hard disk device, an optical disk device, a tape device, a flash memory or other similar solid state memory device, or an array of devices, including devices in a storage area network or other configurations connected by wired or docked or wireless connections. The above-mentioned computer program and instructions, when executed by the processing unit, cause the processing unit and computing device 102/104 to perform one or more tasks, as described in further detail herein below.

Fundamental principles of the systems and methods described herein relate to a vehicle operator's right to provide confirmation of their desire to electronically share (or not share) identifying data, such as, an electronic identification card or a mobile DL (mDL). This right is synonymous with the vehicle operator's right/desire to provide (or not provide) a law enforcement officer their physical driver's license when requested by the officer during conventional traffic stops. Furthermore, the vehicle operator has the option to review and authenticate that the recipient of the information is, in fact, law enforcement or the intended recipient.

In addition, the overall safety and security of both the officer and vehicle operator will be enhanced when the teachings of this specification are implemented. Use of the teachings described herein will provide for more expedient resolution of the traffic stop when vehicle operators utilize, and law enforcement officers assess, a digital identity card (e.g., mDL) rather than a conventional physical identification card or driver's license.

FIG. 1 illustrates a block diagram that includes a communication pattern for information flow that may occur when one or more law enforcement officers request that a vehicle operator pull their vehicle to the roadside for a traffic stop. As shown, vehicle 108, a law enforcement vehicle, includes vehicle interior 138 in which computing device 104 is disposed. In one implementation, computing device 104 may be electronically coupled to the engine/electronic control system and other electronic devices and power systems of vehicle 108. According to the present teachings, there may be a variety of process steps and actions that the officer can accomplish to permit required information flow to occur without leaving the safety and security of vehicle 108.

For example, in one implementation, the officer, while still inside vehicle 108, can provide, by computing device 104, a request 114 for identifying data to the operator/driver within vehicle 106. In this scenario, the computing device 104 is accessible to the officer, thus the officer is considered a user of computing device 104. The request 114 may include a certificate or information indicating the jurisdiction or identifying information of the officer and may include the endpoint for the user to send identifying data.

In some implementations, request 114 for identifying data includes one or more of self-identification data for a first user or a security threshold associated with a second user. For example, the self-identification data for the first user can be a certificate or other data indicating a jurisdiction, or identifying information of the first user. The self-identification data can include a photo or image of the officer/first user as well an identifier (e.g., identification number, badge number) that identifies the first user as being affiliated with a particular entity or government agency.

Providing request 114 can include computing device 104 providing or transmitting combinations of: self-identifying data of the first user, a role of the first user (e.g., an officer or law enforcement agent), data sets being requested of the second user (e.g., relating to identifying data of a user, a residential address of a user, or vehicle registration information), and a threshold security level (e.g., LOA 1, 2, 3, or higher) for authenticating an identity of the second user and for authenticating the identifying data about the second user.

In some implementations, a Level of Assurance/LOA is defined by the by International Organization for Standardization (ISO)/International Electrotechnical Commission (IEC) 29115 Standard which describes a degree of confidence in processes leading up to and including an authentication. Processes associated with an LOA provide assurance that the entity claiming a particular identity, is the entity to which that identity was assigned.

The identifying data 118 may be in an electronic or digital computer readable format and may include a one-time use token/identity token, a single or multiple identifying attributes, an identification item such as a digital or electronic rendering of a personal identification card, digital driver's license or mDL (including card/license number and jurisdiction). Identifying data 118 can identify a second user that uses a digital identity application program that is accessible via computing device 102. Device 102 can cooperate or interact with other described identity systems to ensure identifying data 118 is authenticated in accordance with a particular security level (e.g., a threshold security level or level of assurance).

The operator within vehicle 106 receives, by computing device 102, request 114 for identifying data provided by the officer/user within vehicle 108. Computing device 102 is accessible to the vehicle operator/driver within vehicle 106, thus the operator is considered a user of computing device 102. In various implementations, when a traffic stop occurs and information/data communications are exchanged between the officer and driver, computing device 102 and 104 provide the electronic means by which the data communications occur. Request 114 may contain identifying information about the jurisdiction or the officer. The communication channel between 104 and 102 may be encrypted by standard means for that communications technology.

As described in more detail herein below, upon receipt of the request 114 for identifying data from the officer, the vehicle operator may elect to transmit the requested identifying data to a networked or internet based location associated with an authentication service provider (ASP) 136. The ASP 136 may include identity provider system 137 and employ an authentication protocol capable of communicating back to the mobile device 102 of the user and authenticate the user using one or more modalities including biometrics indicated by feature 105.

In one implementation, the networked location is accessible to the officer by using computing device 104 to access the networked location via an internet protocol (IP) address indicated by a uniform resource locator (URL). In some implementations, that internet location address is provided by the officer (via computing device 104) in the identifying data request communication so as to indicate the precise location that the operator (via computing device 102) should send/transmit the identifying data.

In alternative implementations, a law enforcement officer may utilize computer equipment (i.e., device 104) available within vehicle 106 to transmit/send a presence indicator to the driver of vehicle 106. The presence indicator can be sent over a communication channel 110 to announce the officer's presence relative to vehicle 106 and to identify the officer as law enforcement personnel. Computing device 102 may include one or more device applications that present the vehicle operator with a user selectable option.

The user selectable option permits the operator to verify or validate that the individual providing the request for identifying data is a legitimate requester or law enforcement officer. Additionally, the user selectable option may also permit that operator to verify that the officer is associated with a known law enforcement entity from a particular jurisdiction. The vehicle operator may base the verification on the existence of a self-identifying feature, such as one or more indicators (e.g., sirens, flashing lights, law enforcement jurisdiction logo/mark, digital certificates), generally associated with law enforcement personnel.

In some implementations, device 102 executes and/or uses computing logic to analyze or scan the self-identification data of the first user that is included in request 114. In response to this analysis, computing device 102 can validate the self-identification data for the first user included in request 114.

In some implementations, transmission of identifying data 118 by computing device 102 is preceded by authentication of the second user and presentation of the user selectable option to the second user via a display of computing device 102. The user selectable option can include one of: i) an accept option, or a deny option, and where selection of the accept option enables computing device 102 to transmit validated identifying data to the identity endpoint.

The computing device 104 can include a display or communications method accessible to the first user. In some implementations, identifying data 118 accessed by the first user can be viewable to the first user by way of the display of device 104 or understandable to the first user through a data output mode of computing device 104 and through the communications method. In some instances, the communications method is a haptic-based method, a vibratory method, or an audio/voice enabled method.

In some implementations, communication channel 110 is a proximity-based communications channel configured to exchange data communications between the driver (via computing device 102) and the officer (via computing device 104) by way of, for example, a non-paired Bluetooth communication protocol. In other implementations, instead of proximity-based communication, exchange of data communications between the driver and officer may be accomplished by way of one or more wireless broadcast methods (e.g., Wi-Fi Direct, Nearby Messaging APIs, etc.).

In some implementations, communication channel 110 is one of multiple proximity-based communications channel that are enabled based on operating system design and programming relating to one, or both, of device 102 or device 104. As indicated above, regarding data flow via communication channel 110, the first user or officer's request 114 for identifying data will primarily include a request for state/jurisdiction of the operator's driver license (DL) and a request for the number associated with the DL.

Furthermore, in addition to the request 114 for identifying data, the officer may cause computing device 104 to publish a server location (network/internet based location) on which to send the requested data if/when the request is confirmed or approved by the operator of vehicle 106. In one implementation, the server location (e.g., for application server 136) published by computing device 104 points to a URL corresponding to network/cloud-based systems or software applications which are managed and accessible by the law enforcement computing device 104.

In various implementations, the vehicle operator receives and views the request (via computing device 102) from the officer to share or provide identifying data (e.g., DL state/jurisdiction and DL number). Additionally, the vehicle operator may utilize one or more user selectable options within an example identity verification software application (e.g., mDL application) to one of: 1) "Accept" the request and furnish a digital/electronic mDL rendering (see, mDL 103) of the requested data; or 2) "Deny" the request and refuse to share the digital/electronic rendering of the requested data.

In one implementation, upon selection of accept, validated data about the driver identity can be pushed by an Identity Provider System 137 of the driver to the receiving identity endpoint published by law enforcement in the identifying data request. Similarly, upon selection of deny, no driver identity data is transmitted to the officer which results in the same person-to-person communication pattern as when no driver mDL exists and the vehicle operator can opt to produce their physical driver's license 112. The described features therefore protect the privacy and choice of the vehicle operator to first consent to sharing electronic or physical identification data.

In some implementations, an identity provider service/system 137 executes program code for an API, where the API includes an Open ID Connect protocol or a standardized block chain protocol. Use or execution of each protocol can allow for permissioned and consented access to identifying data 118 of the second user by the computing device 104. In some instances, execution of each protocol allows for permissioned and consented access to identifying data 118 via computing device 104, where permission and consent for access are each granted at the discretion of the second user.

Prior to transmitting the requested identity data to the indicated URL, the vehicle operator may first authenticate to an APS 136 and push digital identity credentials to server 137 so that it can transmit the requested identity data to the indicated URL and the officer may view and verify the operator's mDL.

As shown in FIG. 1, user authentication 116 by the vehicle operator, via computing device 102, may occur through implementation of Level of Assurance 3 (LOA 3) authentication through standard protocols resulting in, for example, facial biometric matching 103. In one alternative implementation, passengers or vehicle occupants having, for example, an mDL or other digital identification may also receive the request for identifying data and may also elect to accept the request and provide each of their digital/mobile DL information.

In various implementations, the law enforcement identity endpoint system (i.e., computer device 104 or an associated server with URL) receives the identity data provided by the vehicle operator which may include the operator's validated mDL rendering, jurisdiction, and number. The user's identity provider system 137 may transmit the driver's identity data, via communication path 118 to the URL on computer system 104 or an associated server with URL, and display the data on an example display device integral to computing device 104 disposed within vehicle 108.

As a result, the law enforcement officer can safely and securely perform a driver lookup based on jurisdiction and Driver's License Number (DLN) of the driver's record using any system available within vehicle interior 138 including computer system 104 without having to exit vehicle 108 to approach the driver residing in vehicle 106. If no driver identity data has been provided within a reasonable time or after a vehicle plate number lookup and initial checks are complete, the officer has the option to approach vehicle 106 as per normal procedure and request to view a physical license card 112 for the driver and/or any of the vehicle occupants.

In yet another alternative implementation, a variety of communication paths are shown in FIG. 1 which indicate the flow of identifying data when a law enforcement (LE) officer in a first state/jurisdiction 128 initiates a traffic stop directed at driver and vehicle originating from (or registered in) a second state/jurisdiction 130 that is different from first jurisdiction 128.

As shown, the officer may initiate a search via communication path 120 within a Criminal Justice Information System (CJIS) that is local to jurisdiction 128 in order to look-up and validate a DLN provided by the vehicle operator from the second state/jurisdiction. Local CJIS 139 (for jurisdiction 128) may then initiate a cross jurisdiction query via communication path 122 and 124 to the remote CJIS 140.

In one implementation, local CJIS 139 interfaces with information systems 134 managed by the National Law Enforcement Telecommunications Systems (NLETS). In particular, a routing entity 132 configured to provide a centrally hosted application program interface (API) may facilitate the exchange of driver information between the NLETS information systems 134 and the local CJIS 139 in jurisdiction 128. Likewise, the routing entity 132 may also facilitate the exchange of driver information between NLETS information systems 134 and a remote CJIS 140 in jurisdiction 130.

Accordingly, path 124 indicates the information flow (e.g., driver information query) into remote CJIS 140 for jurisdiction 130 to look-up identity data, portrait, and driver's license status for the driver undergoing the traffic stop in jurisdiction 128. Remote CJIS 140 may then return or transmit the data to the officer for viewing (via computing device 104) within vehicle interior 138 for verification and validation by the officer.

Figure 2A:
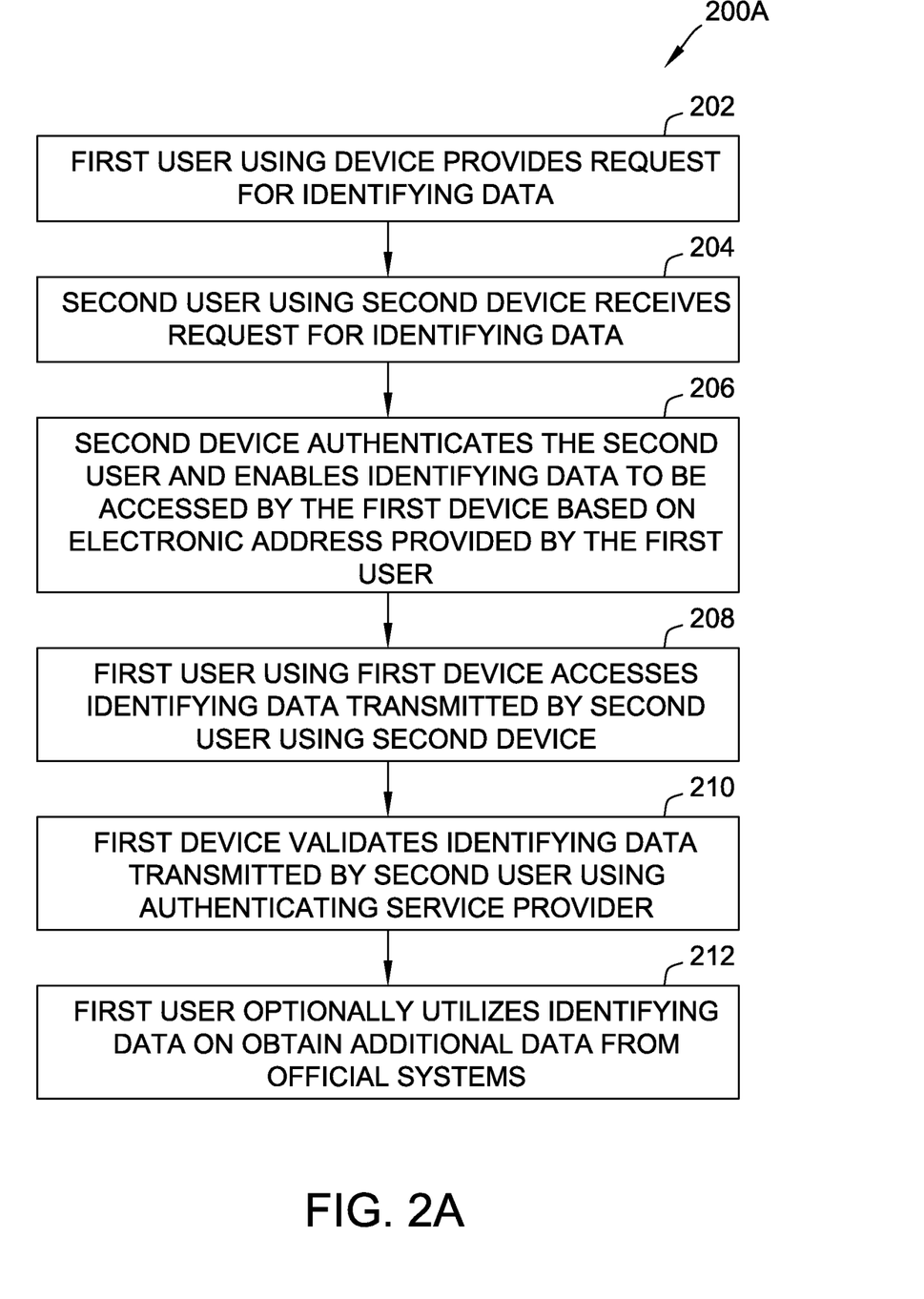
FIG. 2A illustrates a flowchart of an example process for information exchange relating to verification and identification checks.

FIG. 2A illustrates a flowchart of an example process 200A for information exchange relating to verification and identification checks. In various embodiments, process 200A may be implemented and/or executed within system 100. As such, a description of process 200A may reference the aforementioned devices, components and sub-systems of system 100. In some implementations, method 200A corresponds to a communication process for information flow that occurs when one or more law enforcement personnel request that a vehicle operator pull their vehicle to the roadside for a traffic stop.

Method 200A includes decision block 202 where an officer (i.e., first user) causes a request for identifying data to be provided to the operator/driver within vehicle 106. As noted above, the officer may use computing device 104 of vehicle 108 to provide the request while remaining safely within the vehicle's interior 138.

At block 204, method 200A includes the driver (i.e., second user) using computing device 102 to receive the request for identifying data provided by the officer/user within vehicle 108. At block 206 of method 200, the vehicle operator, using the computing device 102, may elect to transmit the requested identifying data using IDP 137 to a networked or internet based location associated with computing device 104 and the receiving URL of communication path 118. The internet location address may be provided by the officer (via computing device 104) in the identifying data request communication to indicate the location the driver (via computing device 102) should use when sending/transmitting the requested data.

At block 208 of method 200, the officer accesses the identifying data transmitted by the vehicle operator and at block 210 verifies/validates that, for example, the driver is at least authorized to legally operate vehicle 106. At block 312 the officer may also utilize the identifying information to obtain further data from systems the officer is entitled to access using computing device 104.

Figure 2B:
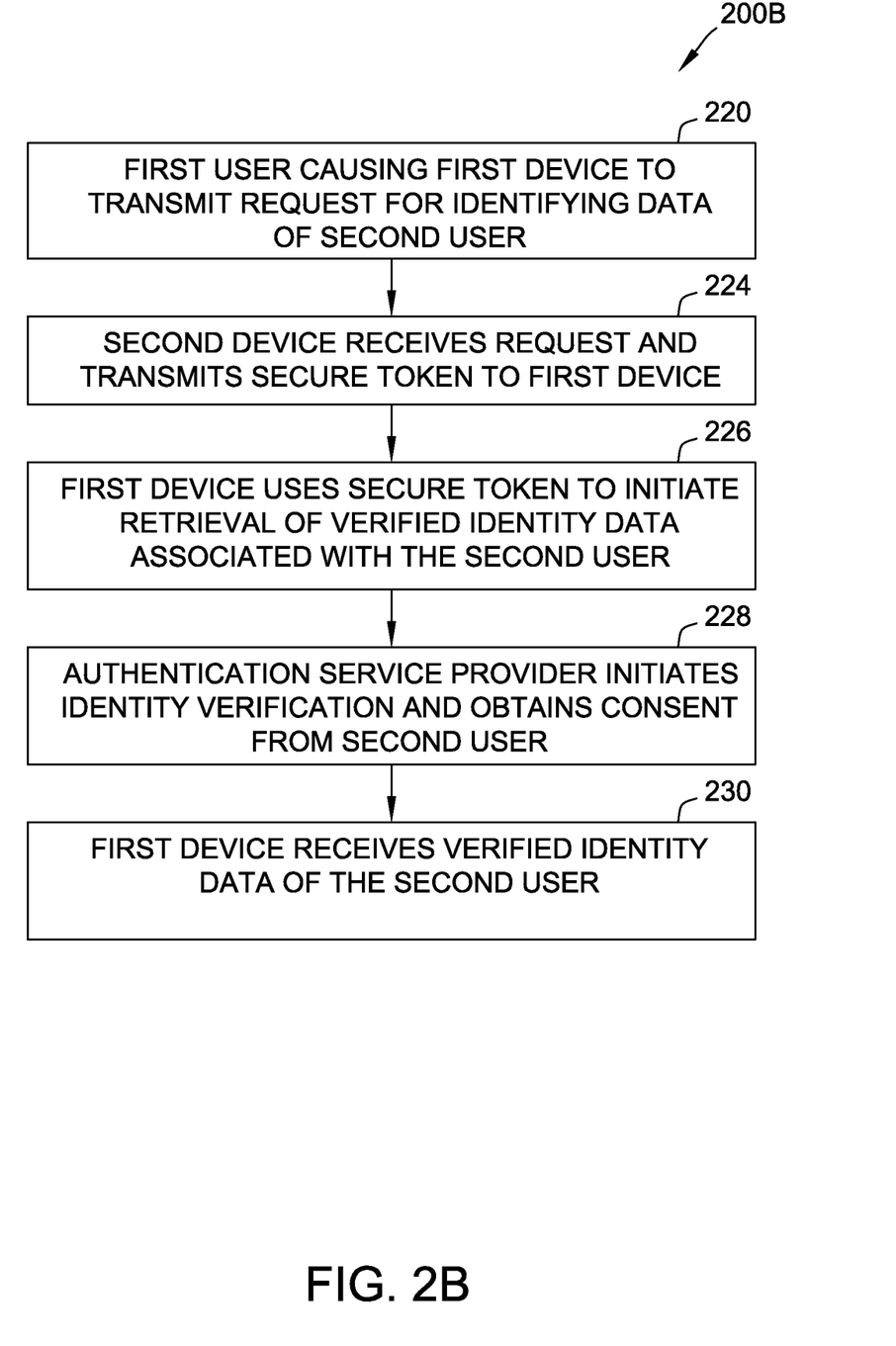
FIG. 2B illustrates a flowchart of an alternate process for information exchange during verification and identification checks, where a second device responds with a one-time identity token and allows a first device to request identifying attributes from an identity provider.

FIG. 2B illustrates a flowchart of a process 200B for information exchange during verification and identification checks, where a second device responds with a one-time identity token and allows a first device to request identifying attributes from an identity provider.

At block 220 of process 200B, a first user (e.g., an officer) causes a computing device 104 to transmit a request for identifying data. At block 224, computing device 102 receives the request for identifying data that is provided/transmitted by device 104. Based on the received request, a user of device 102 can cause the device to transmit a secure token that is received by device 104.

At block 226, in implementations where a token (e.g., one-time identity token) is the response to the request from the first-user that is transmitted by device 104, the token can be received and used by device 104 to transmit a request for user authentication of a second user (e.g., driver of a vehicle), consent from the second user to allow certain data to be viewed by the first user, and identifying data directly from the second user.

In some implementations, device 104 uses the token to obtain verified identifying data about the second user by transmitting a request to an Identity Provider (IDP) and User Authentication Services to which the second user is pre-registered. In some instances, the IDP verifies the identity of the second user and identifies the computing device 102 as being a registered device or a device that is registered with the IDP as belonging to, or being owned by, a user with an identity that matches that of the second user.

At block 228, an authentication service provider (IDP 137) can initiate requests to verify the second user's identity and to obtain consent from the second user to release identifying data about the second user. In some implementations, the IDP 137 can include an Open ID Connect Provider (OP) 141 that uses a particular challenge protocol to either authenticate the identity of the second user, obtain consent from the second user to release identifying data about the second user, or both.

Communication path 115 can correspond to data transmissions associated with OP 141 and device 102 exchanging communications relating to execution of the challenge protocol. In some implementations, the challenge protocol to an OP from a first-user can be Open ID Connect with the OP orchestrating user authentication and consent using standard or proprietary protocols. In some instances, the challenge protocol to device 102 of the second user by the OP could be Fido Alliance or similar.

An mDL device (e.g., device 102) of the second-user has the ability to authenticate the user of the device application. Whether challenged by OP 141 or by device 104 of the first-user, an mDL application executing via device 102 is responsible for demonstrating, via cryptographic or other means, that the second-user is the intended user of the mDL application. In some implementations, a challenge to confirm the identity of the second user can be initiated and transmitted to device 102 from device 104.

A response to the challenge can include data that is sent back to device 104 of the first-user, where the data that is sent back can augment identifying data/information of about the second user with user authentication information about the second user. In some implementations, the response to the challenge is relayed directly to device 104 or a related device endpoint of the first-user. In other implementations, the response to the challenge is relayed by OP 141 from device 102 of the second-user to an identity endpoint that is accessible by device 102 of the first user.

In some implementations, the operation of responding to the request transmitted by device 104 of the first user can be transmitted or forwarded by device 102 of the second user to an Identity Provider (e.g., communication path 115). The Identity Provider can orchestrate authentication and consent of the proper user of the second-device 102, and can respond on behalf of the second-user with identifying information about the second user.

In some implementations, device 102 transmits or forwards request 114 for identifying data 118 provided by the device 104 to an identity provider (e.g., IDP 137) to which the second user is registered. The identity provider can verify or validate the identity of the second user and can provide validated identifying data 118 about the second user for access using an electronic address that can be accessed by device 104. In some instances, the electronic address is a URL for an identity endpoint that is accessible by the computing device 102 and by computing device 104.

In other implementations, an optional operation pathway is for the second device 102 to respond with a one-time identity token (as described above) that first device 104 may exchange with the Identity Provider. This exchange can be initiated by device 102 so that authenticated identifying information about the second-user can be obtained and accessed by the first user via device 104. Likewise, the exchange can initiate the Identity Provider to obtain confirmation that the second-user themselves has been authenticated as the proper holder or user of the identity/mDL application executing via second-device 104.

Figure 3:
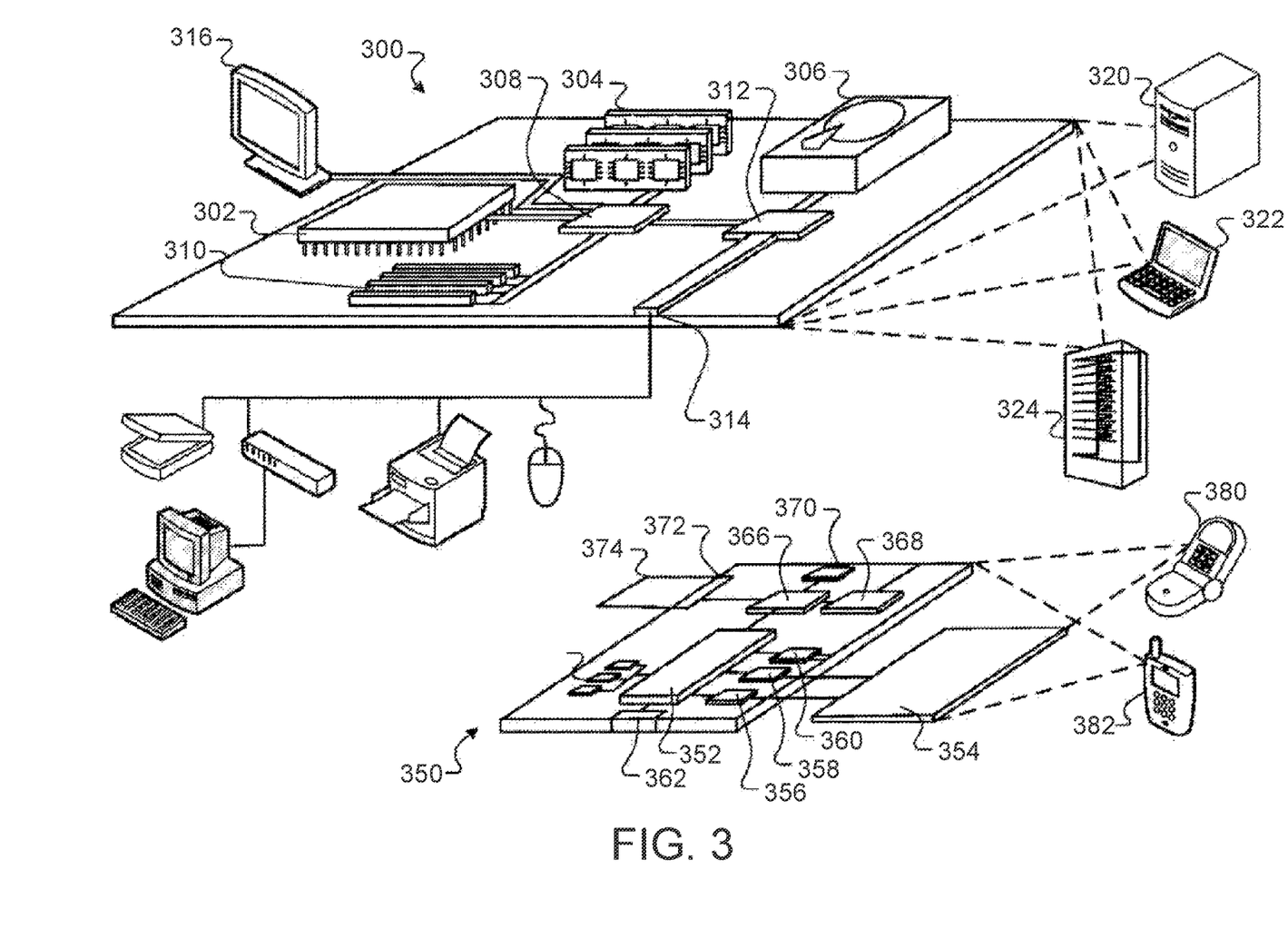
FIG. 3 is a block diagram of a computing system that can be used in connection with computer-implemented methods described in this specification.

FIG. 3 is a block diagram of computing devices 300, 350 that may be used to implement the systems and methods described in this document, either as a client or as a server or plurality of servers. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a computer-readable medium. In one implementation, the memory 304 is a volatile memory unit or units. In another implementation, the memory 304 is a non-volatile memory unit or units.

The storage device 306 is capable of providing mass storage for the computing device 300. In one implementation, the storage device 306 is a computer-readable medium. In various different implementations, the storage device 306 may be a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 304, the storage device 306, or memory on processor 302.

The high-speed controller 308 manages bandwidth-intensive operations for the computing device 300, while the low speed controller 312 manages lower bandwidth-intensive operations. Such allocation of duties is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can process instructions for execution within the computing device 350, including instructions stored in the memory 364. The processor may also include separate analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD display or an OLED display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of device 350 with other devices. External interface 362 may provide, for example, for wired communication (e.g., via a docking procedure) or for wireless communication (e.g., via Bluetooth or other such technologies).

The memory 364 stores information within the computing device 350. In one implementation, the memory 364 is a computer-readable medium. In one implementation, the memory 364 is a volatile memory unit or units. In another implementation, the memory 364 is a non-volatile memory unit or units. Expansion memory 374 may also be provided and connected to device 350 through expansion interface 372, which may include, for example, a SIMM card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provided as a security module for device 350, and may be programmed with instructions that permit secure use of device 350. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS receiver module 370 may provide additional wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380. It may also be implemented as part of a smartphone 382, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed.

For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

I claim:

1. A computing device for exchanging identity data from a digital credential, said computing device comprising:
 a processing unit; and
 a non-transitory storage medium storing the digital credential and executable instructions that, upon execution by the processing unit, configure the processing unit to:
  receive a request for identity data from a remote computing device, the request including one or more of self-identification data for a first user associated with the remote computing device and a security threshold associated with a second user;
  validate the self-identification data for the first user included in the request;
  authenticate identity data for the second user, from the digital credential, and verify the second user is an intended user of the identity data, wherein authenticating and verifying are executed according to a protocol associated with the security threshold included in the request;
  transmit the identity data for the second user to a location identified by an electronic address included in the request, wherein the transmitted identity data indicates a result of authenticating the identity data and verifying the identity data of the second user; and
 wherein the processing unit, upon execution of the executable instructions, is further configured, in transmitting the identity data, to transmit a one-time use identity token to be used by the remote computing device to authenticate the second user using an identity provider to which the second user is associated, wherein the identity provider verifies the identity of the second user and identifies said computing device as associated with the digital credential.

2. The computing device of claim 1, wherein the processing unit, upon execution of the executable instructions, is further configured to receive the request for identity data over a proximity-based communication channel configured to exchange data communications with the remote computing device using a Bluetooth communication protocol, a Near-Field Communications protocol, Wi-Fi Direct, or a Nearby Messaging API of the remote computing device or said computing device.

3. The computing device of claim 1, wherein the processing unit, upon execution of the executable instructions, is further configured to validate a self-identifying feature of the first user included in the request, the self-identifying feature including an indicator for a law enforcement agency or a certificate of authenticity of the law enforcement agency or officer.

4. The computing device of claim 1, wherein the processing unit, upon execution of the executable instructions, is further configured, in transmitting the identity data, to transmit at least one of an identification number for the digital credential or an indication of a jurisdiction that issued the digital credential.

5. The computing device of claim 1, wherein the processing unit, upon execution of the executable instructions, is further configured, in receiving the request for identity data, to receive the electronic address including a uniform resource locator for an identity endpoint that is accessible by the remote computing device and said computing device.

6. The computing device of claim 5, wherein the processing unit, upon execution of the executable instructions, is further configured to:
authenticate, before transmitting the identity data, the second user; and
present a user selectable option to the second user, the user selectable option comprising one of i) an accept option, or ii) a deny option, wherein the selection of the accept option enables transmission of the validated identity data from the digital credential to the identity endpoint.

7. The computing device of claim 1, wherein the processing unit, upon execution of the executable instructions, is further configured, in receiving the request for identity data, to receive an option to exchange data communications with the remote computing device using a secure communication channel and the electronic address included in the request.

8. The computing device of claim 1, wherein the first user is a law enforcement officer and the second user is at least one of an operator of a motor vehicle or a passenger within a motor vehicle.

9. A computing device for exchanging identity data from a digital credential, said computing device comprising:
a processing unit; and
a non-transitory storage medium storing executable instructions that, upon execution by the processing unit, configure the processing unit to:
transmit a request for identity data to a second computing device storing the digital credential, the request including one or more of self-identification data for a first user associated with said computing device and a security threshold associated with a second user;
gain access to the identity data for the second user at a location identified by an electronic address included in the request, wherein the identity data indicates a result of authenticating and verifying, by the second computing device, of the identity data from the digital credential of the second user;
transmitting at least a portion of the identity data to an identity provider with which the second user is associated to authenticate the second user, and to identify the second computing device as associated with the digital credential; and
wherein the processing unit, upon execution of the executable instructions, is further configured, in transmitting at least a portion of the identity data, to transmit a one-time use identity token to the identity provider to authenticate the digital credential of the second user.

10. The computing device of claim 9, wherein the processing unit, upon execution of the executable instructions, is further configured, in transmitting the request for identity data, to transmit the request for identity data over a proximity-based communication channel configured to exchange data communications with the second computing device using a Bluetooth communication protocol, a Near-Field Communications protocol, Wi-Fi Direct, or a Nearby Messaging API of the computing device or the second computing device.

11. The computing device of claim 9, wherein the processing unit, upon execution of the executable instructions, is further configured, in transmitting the request for identity data, to transmit a self-identifying feature of the first user to be used by the second computing device to authenticate the first user, the self-identifying feature including an indicator for a law enforcement agency, a certificate of authenticity, or a second digital credential of the law enforcement agency or officer.

12. The computing device of claim 9, wherein the processing unit, upon execution of the executable instructions, is further configured, in transmitting the request for identity data, to transmit a uniform resource locator for an identity endpoint that is accessible by the computing device and the second computing device.

13. The computing device of claim 12, wherein the processing unit, upon execution of the executable instructions, is further configured, in transmitting the request for identity data, to transmit an option to exchange data communications with the second computing device using a secure communication channel and the electronic address included in the request.

14. The computing device of claim 9, wherein the first user is a law enforcement officer and the second user is at least one of an operator of a motor vehicle or a passenger within a motor vehicle.

15. A method of exchanging identity data from a digital credential, the method comprising:
transmitting, from a first computing device, a request for identity data from the digital credential, the request including one or more of self-identification data for a first user associated with the first computing device and a security threshold associated with a second user;
receiving, at a second computing device storing the digital credential, the request from the first computing device, wherein the second computing device is accessible by the second user;
validating, by the second computing device, the self-identification data included in the request;
authenticating, by the second computing device, identity data, from the digital credential, for the second user, and verifying the second user is an intended user of the identity data, and wherein authenticating and verifying are executed according to a protocol associated with the security threshold included in the request;
transmitting, from the second computing device, the identity data to a particular location identified by an electronic address included in the request, wherein the transmitted identity data indicates a result of authenticating the identifying data and verifying the identity data of the second user;
accessing, by the first computing device, the identity data transmitted by the second computing device;
validating, by the first computing device, in response to the accessing, the identity data transmitted by the second computing device; and
wherein transmitting the identity data includes transmitting, by the second computing device, a one-time use identity token the first computing devices uses to authenticate the second user using an identity provider to which the second user is associated, the method further comprising verifying, by the identity provider, the identity of the second user, and identifying the second computing device as associated with the digital credential.

16. The method of claim 15, wherein transmitting the request for identity data comprises transmitting the request using a proximity based communication channel configured to exchange data communications between the first computing device and the second computing device using a Bluetooth communication protocol, a Near-Field Communications protocol, Wi-Fi Direct, or a Nearby Messaging API of the first or second computing device.

17. The method of claim 15, wherein transmitting the request for identity data comprises transmitting an option to exchange data communications between the first computing device and the second computing device using a secure communication channel and the electronic address included in the request.

18. The method of claim 15, further comprising validating, by the second computing device, a self-identifying feature of the first user included in the request provided by the first computing device, the self-identifying feature of the first user being an indicator for a law enforcement agency, a certificate of authenticity, or a second digital credential of the law enforcement agency or officer.

19. The method of claim 15, wherein transmitting the identity data includes transmitting, by the second computing device, at least one of an identification number for the digital credential or an indication of a jurisdiction that issued the digital credential.

20. The method of claim 15 further comprising executing, by the identity provider, program code for an API, where the API includes an Open ID Connect protocol or a standardized block chain protocol, and wherein each protocol allows for permissioned and consented access to identifying data of the second user by the first computing device and at the second user's discretion.

21. The method of claim 15 further comprising:
forwarding, by the second computing device, the request for identity data to an identity provider to which the second user is associated;
verifying, by the identity provider, the identity of the second user; and
granting, by the identity provider, access to validated identity data about the second user.

22. The method of claim 15, wherein the electronic address included in the request transmitted by the first computing device includes is a uniform resource locator for an identity endpoint that is accessible by the first computing device and by the second computing device, and through which the validated identity data is exchanged.

23. The method of claim 22 further comprising:
authenticating, by the second computing device before transmitting the identity data, the second user; and
presenting, on the second computing device, an option comprising one of i) an accept option, or ii) a deny option, wherein selection of the accept option enables the second computing device to transmit the validated identity data to the identity endpoint.

24. The method of claim 15, wherein the first computing device includes a display or communications method accessible to the first user, and wherein the identifying data accessed by the first user is viewable to the first user via the display or understandable to the first user through a data output mode of the computing device through the communications method.

25. The method of claim 15, wherein the first user is a law enforcement officer and the second user is at least one of: an operator of a motor vehicle, or a passenger within a motor vehicle or a citizen participant being identified through the interaction.

26. The method of claim 15, wherein transmitting the request by the first computing device includes transmitting combinations of:
self-identifying data of the first user,
a role of the first user,
data sets being requested of the second user, and
a threshold security level for authenticating an identity of the second user and the identifying data about the second user.

* * * * *